Feb. 12, 1952 — A. W. WEEMS — 2,585,062
RECIPROCATING SPINDLE TYPE COTTON HARVESTER
Filed March 15, 1947 — 7 Sheets-Sheet 1
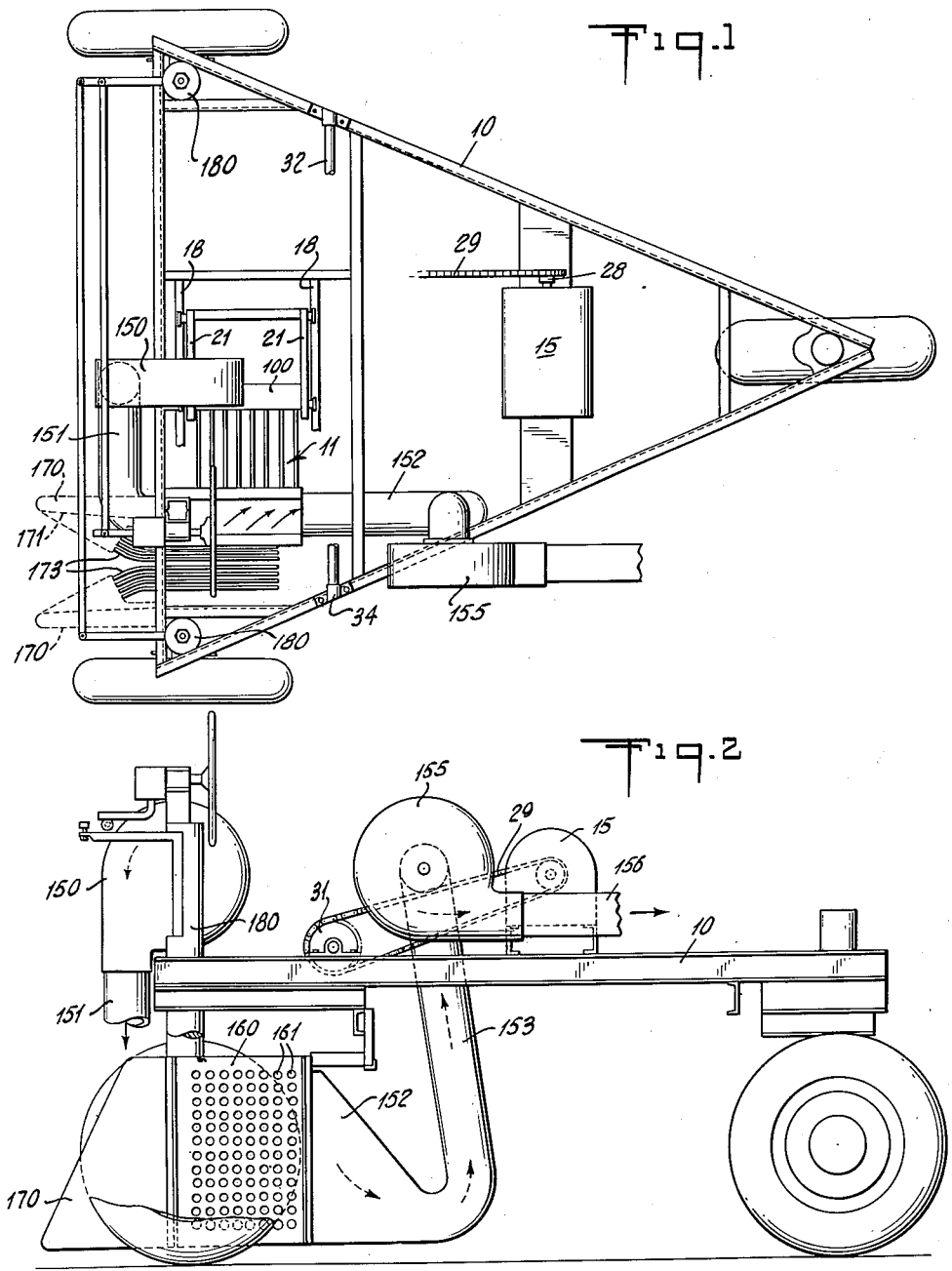
INVENTOR.
ALBERT W. WEEMS.
BY
ATTORNEY.

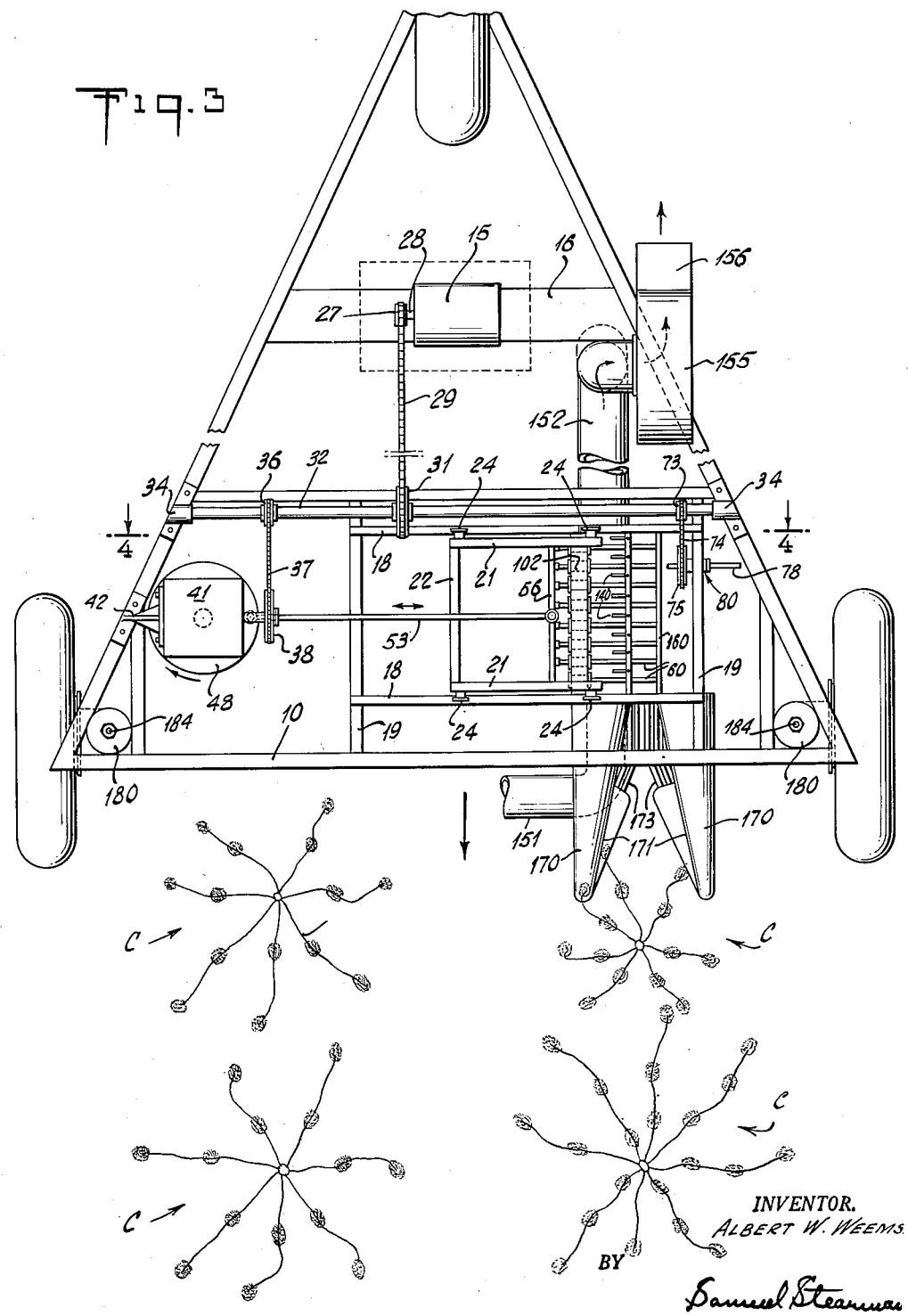

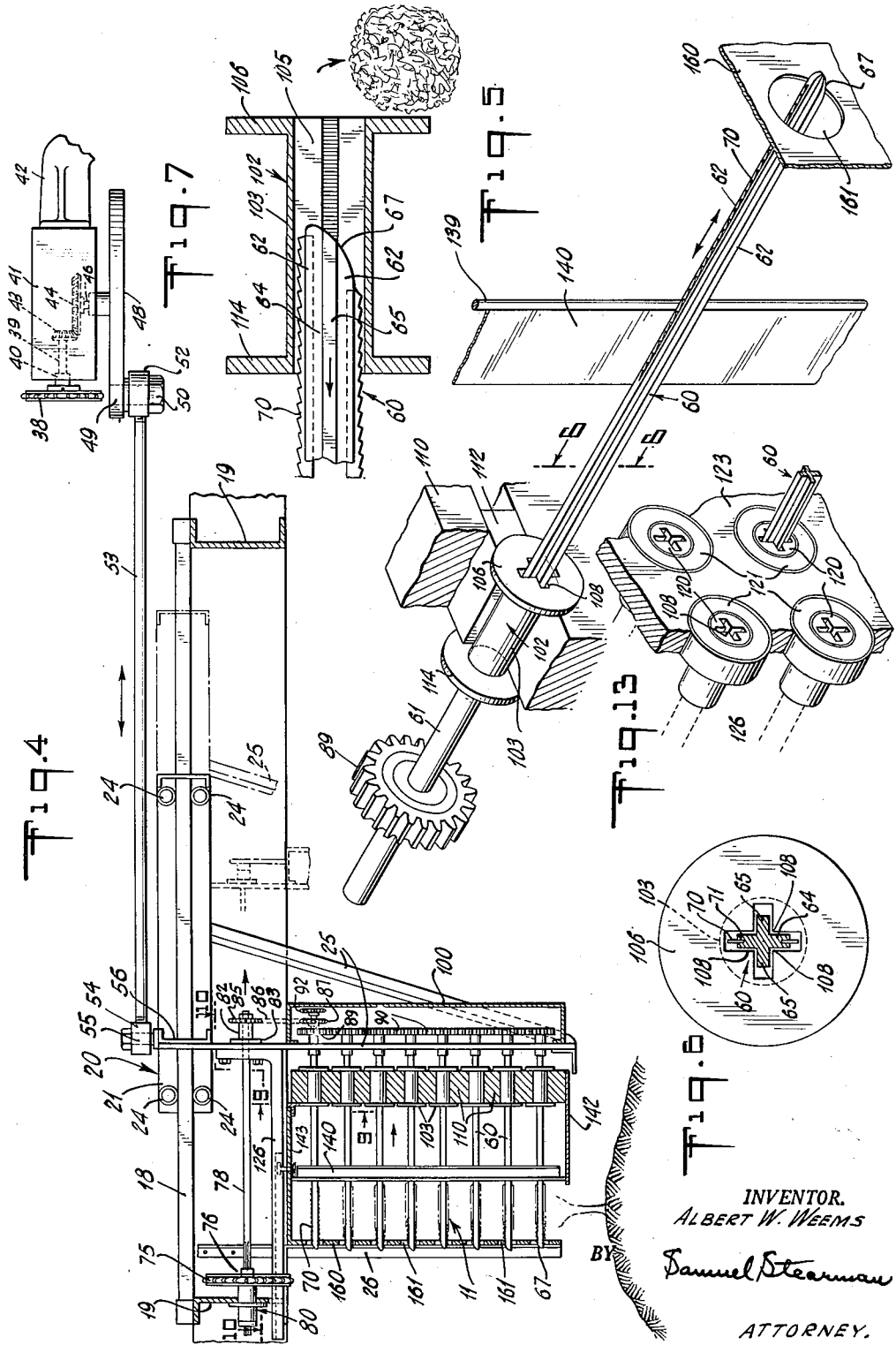

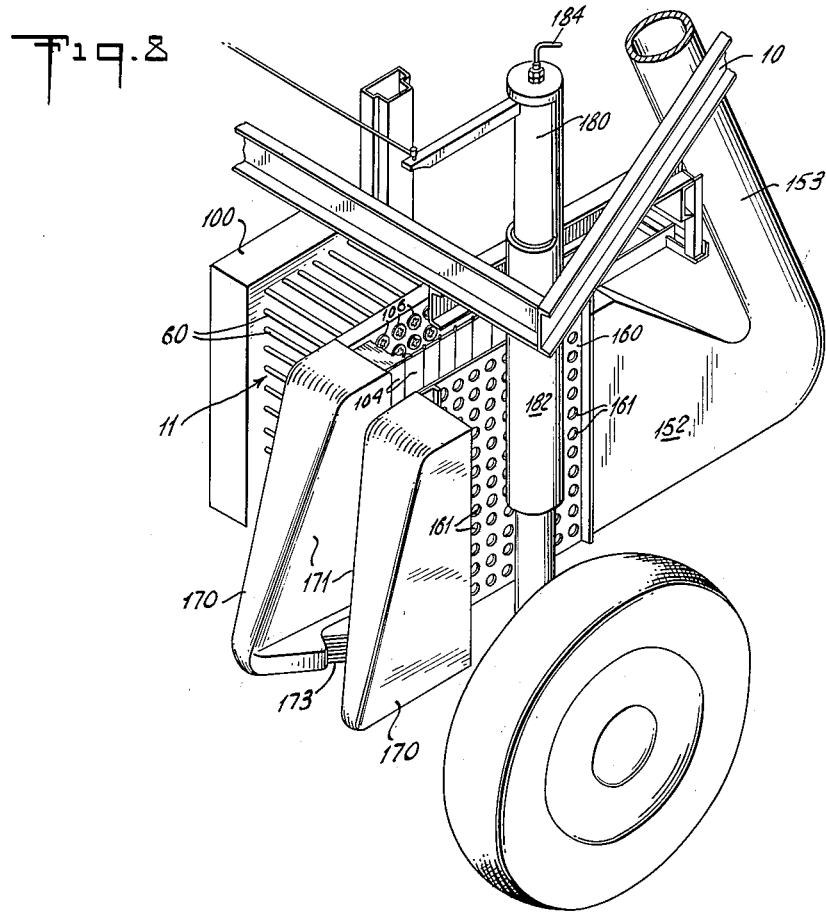

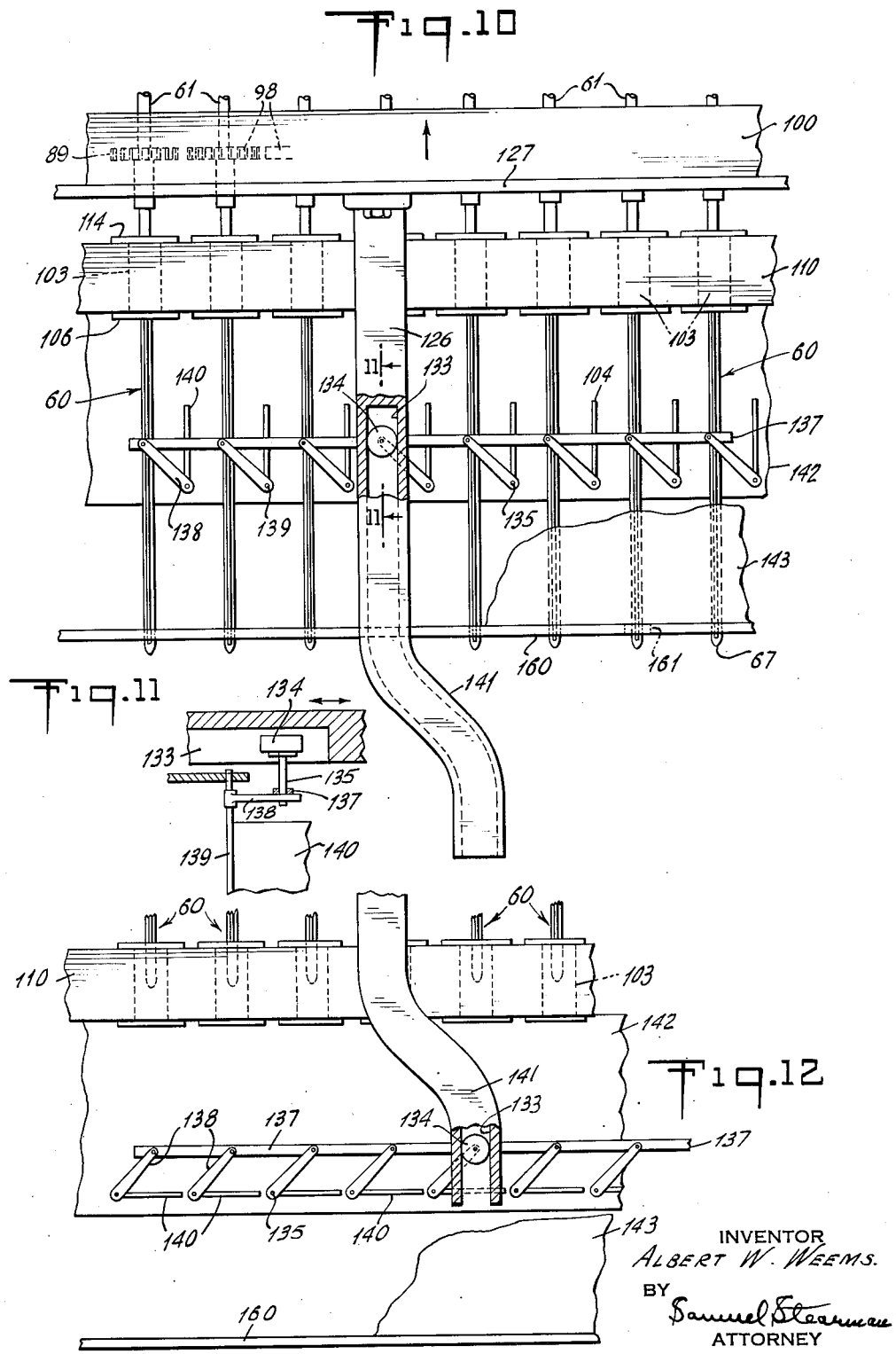

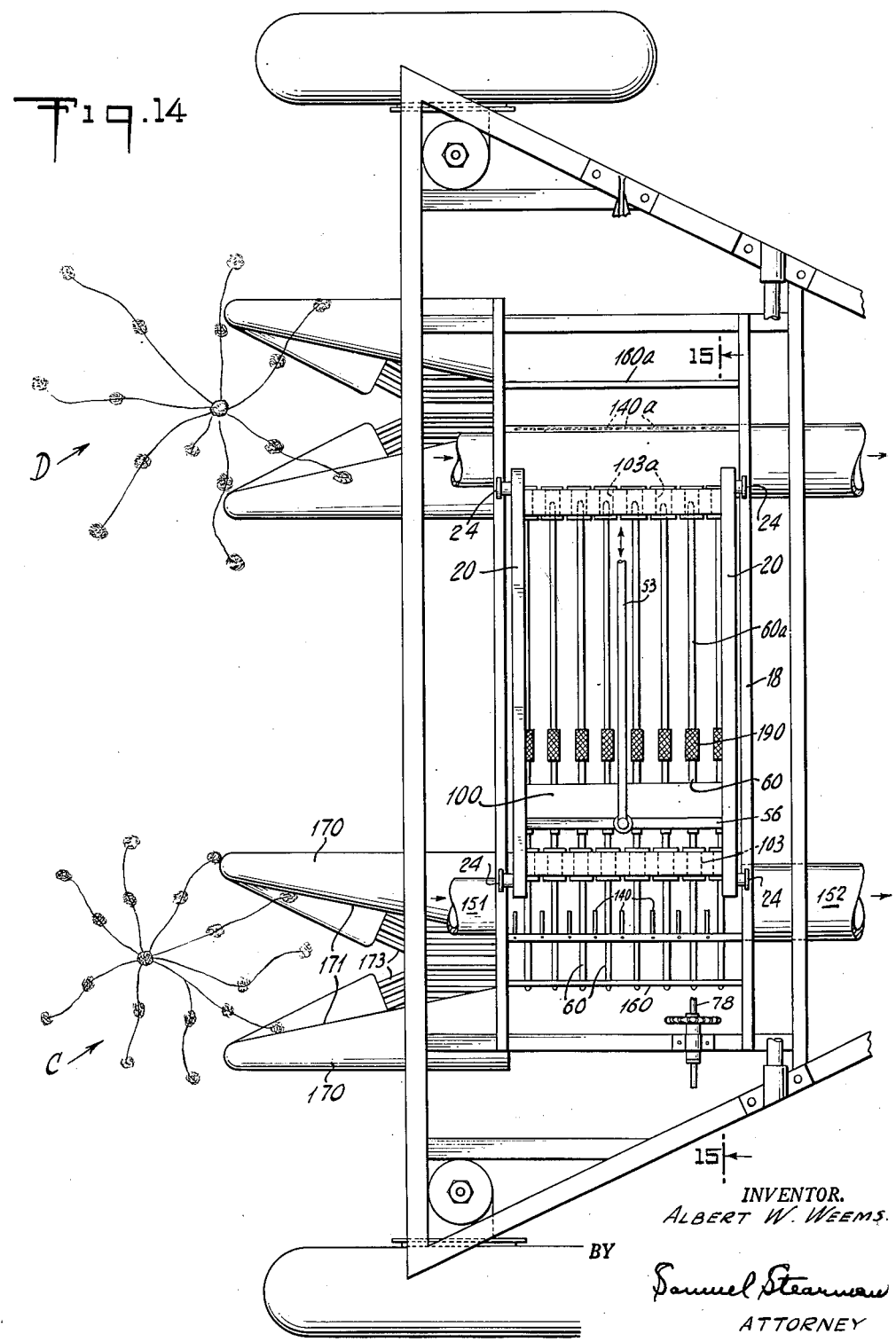

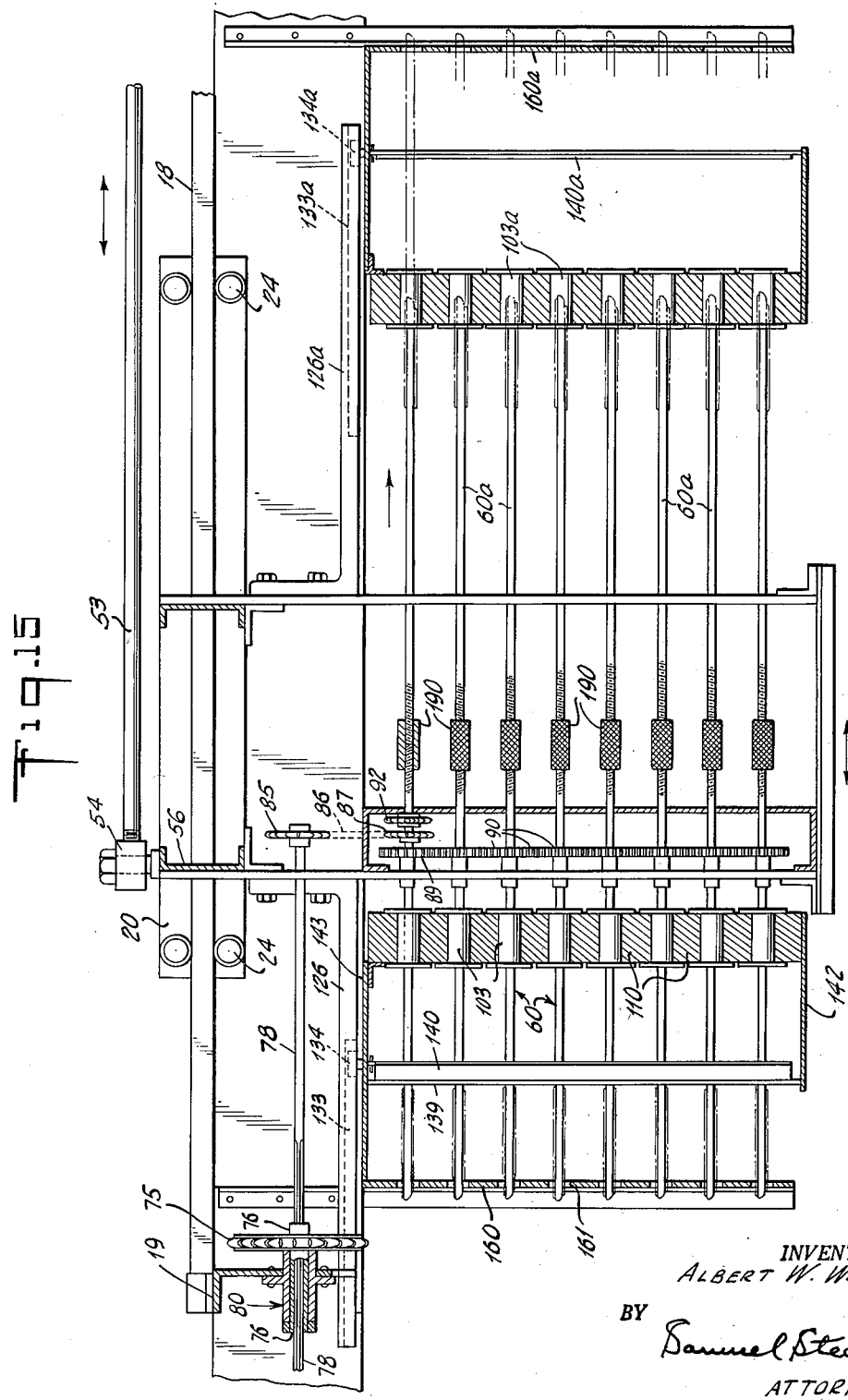

Patented Feb. 12, 1952

2,585,062

UNITED STATES PATENT OFFICE 2,585,062

RECIPROCATING SPINDLE TYPE COTTON HARVESTER

Albert W. Weems, Meridian, Miss.

Application March 15, 1947, Serial No. 734,895

13 Claims. (Cl. 56—41)

This invention relates to a mechanical cotton picker and has, as its primary object, the provision of improved mechanism by means of which cotton may be picked from the open bolls of cotton plants in a satisfactory and efficient manner.

As is well known, while many efforts have been made to devise mechanical cotton pickers and many patents have been granted upon various forms of machines for picking cotton, few of these prior machines have been built and used. Such of them as have been built, as well as others which have been proposed, have proved to be impractical for any one or several of a number of reasons. Many of the heretofore proposed machines have been inherently defective in principle or have proved to be impractical or faulty after a relatively short period of actual operation, owing to such causes as severe degradation of the cotton or the inability of the picking spindles or needles to remove a satisfactory portion of the cotton from the open bolls without at the same time injuring the unopened bolls or causing other injury to the plants. In some instances, the difficulty has been that even if the picking spindles or needles satisfactorily removed cotton from the open bolls, the means employed for stripping the cotton from the spindles or needles proved to be faulty for one reason or another, as for example, the tendency towards accumulation of cotton lint in or around the stripping mechanism and eventual clogging thereof so that the machine could no longer function properly.

The machine of my invention, as will hereinafter more clearly appear, is constructed upon principles such that it is relatively light in weight, inexpensive to build, easy to operate and maintain and will pick substantially all of the ripened cotton from the plants in one pass alongside thereof. Furthermore, the machine of my invention is capable of picking the cotton from the open bolls whether the cotton be dry or wet, and without requiring the washing of the picking spindles. The machine of my invention is one that is as suitable for use, from the economic standpoint, by the small grower of cotton as by the large grower of cotton.

The cotton picker of my invention embodies a bank of continuously and rapidly rotating spindles for engaging cotton with which the spindles come into contact, the bank of spindles being arranged to operate upon the plants of a row from one side thereof as the machine moves along the row, the bank of spindles entering and being withdrawn from the plants by horizontal reciprocating movement. Associated with each of the spindles is a stripper device by means of which a positive stripping action is exerted to strip from each spindle, during each reciprocative stroke of the bank of spindles away from the plants, all the cotton picked up by the spindles during the previous reciprocative stroke into the plants.

An important feature of the machine of my invention resides in the form of the spindles and the strippers that are employed, as will hereinafter more clearly appear. Another feature of my machine is that in the retracted or stripping position of the spindles, the outermost ends thereof are positioned a substantial distance interiorly of the strippers, the latter having enlarged portions at their forward ends to provide a relatively flat surface along which centrifugal force, exerted by the rapidly rotating spindles, serves to force cotton, removed from the spindles by the strippers, away from the forward open end of the strippers. Thus, the construction and operation of the stripper device employed in my invention is such that it prevents any tendency for cotton lint to string out in long threads which might hold to the ends of the spindles upon retraction into the strippers and not permit it to be evacuated.

The cotton stripped from the spindles upon each reciprocative stroke thereof into retracted or stripping position, is conveyed preferably by means of an air stream, to a collecting receptacle on the machine. To that end, I provide a series of shutters, one for each row of spindles in the bank, these shutters being located intermediate the strippers and the ends of the spindles when the latter are fully extended and being arranged to operate in timed relation to the reciprocation of the bank of spindles, so as to be moved into position to be cleared by the spindles during each forward reciprocative stroke thereof and into closed position, substantially at a right angle to the last-named position, each time the spindles are retracted into the strippers. In the closed position of the shutters, there is formed a relatively confined passageway enabling cotton falling or discharged into this passageway during each successive retraction of the spindles into the strippers, to be conveyed away to the collecting receptacle, as by means of blowers or suction fans.

Another feature of the machine embodying my invention resides in the provision of a resistance member functioning to assist in causing the cotton removed by each of the spindles to wrap itself more firmly around the spindles.

Another feature is that when employed for picking cotton from plants having an unusually high yield, the machine of my invention can be moved along the row of the plants at a rate of speed to permit the picking mechanism thereof to act one or more times in the same place in the plants.

Still another feature of my invention is that it is adaptable for embodiment in a form to permit the simultaneous picking of the cotton in two adjacent rows of cotton plants.

Other features of my invention will appear from the more detailed description which follows.

In the accompanying drawings:

Fig. 1 is a diagrammatic plan view showing in general outline, but with certain parts omitted, a cotton picking machine embodying my invention, mounted on a suitable vehicle;

Fig. 2 is a similar diagrammatic view in side elevation;

Fig. 3 is a diagrammatic plan view of the machine on a somewhat enlarged scale, and showing its operative relation to one of two adjoining rows of cotton plants;

Fig. 4 is an enlarged view, partly in cross-section, taken along line 4—4 of Fig. 3;

Fig. 5 is an enlarged detail view, in perspective, of one of the picking spindles employed according to the invention and showing its relation to the stripper for stripping therefrom the cotton removed from the plant by the spindle, as well as its relation to other parts of the machine;

Fig. 6 is a detail view in elevation, taken along line 6—6 of Fig. 5;

Fig. 7 is a view in cross-section taken longitudinally of one of the strippers and its associated spindle, the latter being shown in its retracted position in which the cotton has been stripped therefrom.

Fig. 8 is a view in perspective, showing the cotton picking mechanism of my invention, with certain of the parts omitted, as it appears when viewed from the forward end of the vehicle;

Fig. 9 is an enlarged sectional view taken along line 9—9 of Fig. 4;

Fig. 10 is an enlarged view, partly in cross-section, taken along line 10—10 of Fig. 4;

Fig. 11 is a detail sectional view taken along line 11—11 of Fig. 10;

Fig. 12 is a view similar to Fig. 10 showing the parts in another position;

Fig. 13 is a fragmentary view in perspective, showing another form of stripper that may be employed in accordance with the invention;

Fig. 14 is a fragmentary plan view illustrating certain parts of the machine embodying my invention as adapted for the picking of cotton simultaneously from two adjacent rows of plants; and Fig. 15 is an enlarged view partly in cross-section taken along line 15—15 of Fig. 14.

The machine of my invention comprises a framework indicated generally at 10, suitably mounted on a vehicle such as a tractor, driven by a suitable motor (not shown) and provided with convenient steering means.

A bank of spindles, indicated generally by the numeral 11, is mounted beneath the framework 10 near one side of the vehicle, the bank of spindles being arranged to be reciprocated as a unit substantially at a right angle to the path of movement of the vehicle, into and out of the cotton plants of a row from one side thereof, during forward motion of the vehicle.

Power for reciprocating the bank of spindles and also for rotating the spindles may be provided by a suitable power unit indicated at 15, mounted on a support 16 secured to the framework.

Extending transversely of the machine are a pair of parallel rails 18 secured to supports 19 attached to the framework. Arranged for reciprocal movement along the rails 18 is a carriage 20, preferably comprising parallel end members 21 and a side member 22, and including pairs of wheels 24 for engagement with the rails 18. Referring more particularly to Fig. 4, it will be noted that the bank of spindles 11 is rigidly supported by the carriage 20 as by means of braces 25 so as to reciprocate with the carriage.

A sprocket 27 fast to the output shaft 28 of the power unit 15 may be connected by a chain 29 to a sprocket 31 fast to a countershaft 32 extending transversely of the vehicle and journaled in bearings 34 secured to the framework. Another sprocket 36, fast on the shaft 32, may be connected by a chain 37 to a sprocket 38, secured to one end of a shaft 39 journaled in a suitable bearing 40. The shaft 39 and bearing 40 extend into a housing 41 secured to the framework as by a bracket 42. The inner end of the shaft 39 carries a bevel gear 43 meshing with a bevel gear 44 at the upper end of a vertically extending shaft 46. To this shaft is fastened a disk 48, having an eccentrically mounted crankpin 49 held as by a bolt 50 in a collar 52 at one end of a pitman or connecting rod 53. The opposite end of the pitman is connected to a pin 55 mounted on a cross member 56 extending between and secured to the end members 21 of the carriage 20. Thus, actuation of the countershaft 32 from the power unit 15 drives the disk 48 to effect reciprocal movement of the carriage 20 carrying the spindle assembly therewith.

The spindles are arranged in a plurality of vertical and horizontal rows, the drawings illustrating eight vertical rows of twelve spindles each. It will be understood, of course, that the number of spindles in each row, as well as the number of rows of spindles, may be varied to suit the desired capacity of the machine.

The construction of the spindles is shown in greater detail in Figs. 5, 6 and 7. The spindle, indicated generally by numeral 60, comprises a shank portion 61 and a grooved or rabbeted portion 62 extending rearwardly from substantially the forward or tip end thereof back to the shank. The grooving of each spindle is such as to provide a cruciform configuration cross-sectionally. Preferably this configuration is one in which, as shown, one of the pairs of the radiating arms or ribs 64 extends substantially at a right angle to the other pair of radiating arms or ribs 65.

In order to prevent the forward end of the spindles from impinging or boring into the stalks or limbs or unripe bolls on the cotton plants as the spindles enter the plant in their reciprocating movement, the outermost ends of the spindles are bevelled as shown at 67 from a point of intersection within the boundary of one of the ribs so that the outermost end or tip of the spindle will be offset slightly with respect to the longitudinal axis of the spindle.

One or both of one of the pairs of ribs 64—65 of the spindle are provided with serrations along the forward end thereof for seizing the cotton from the bolls with which the rotating spindles come into contact in their reciprocal movement into the cotton plants. One convenient mode of providing such serrations is to fasten a saw tooth blade or blades 70, as by means of rivets or the like, within a slot or slots 71 extending longitudinally of the rib or ribs.

In the operation of the machine, each of the spindles is continuously and rapidly rotated during the reciprocal movement of the entire bank of spindles as a unit into and out of contact with the cotton plants. The speed of rotation may vary from approximately 1500 to 2500 R. P. M. The speed of rotation is such as will cause the serrated portion of the spindles to seize the cotton with which they come into contact as they enter the plants, without causing the thus seized cotton to become wrapped too tightly around the spindle.

Rotation of the spindles is preferably effected by drive means connected to the power unit 15. The countershaft 32 has a sprocket 73 secured thereon, adjacent the end thereof opposite where the drive for the disk 48 is located. The sprocket 73 is connected by a chain 74 to a sprocket 75 secured to a spline hub 76 which is journaled in bearing 80 secured in support 19. Extending through the spline hub 76 is a spline shaft 78, having its opposite end journaled in a bearing 82 mounted in a plate 83 fastened to bracing members which connect the carriage 20 with the bank of spindles. Thus, it will be seen that the shaft 78 reciprocates with the bank of spindles and the reciprocating carriage 20.

Fastened to the shaft 78 adjacent the bearing 82 is a sprocket 85 connected by a chain 86 to a sprocket 87 secured to the shank of the uppermost spindle in one of the vertical rows of spindles 60. This spindle of the row also carries a gear 89 forming one end of a train of gears 90 secured adjacent the ends of the remaining spindles in the same vertical row. Thus, rotation of the shaft 78 actuates for rotation all of the spindles in that vertical row (see Fig. 9). Also secured to the spindle carrying the sprocket 87 is a sprocket 92 connected by a horizontally moving chain 94 to sprockets 96 fastened to the shanks of the uppermost spindles in the remaining vertical rows of spindles. The shank of each of these uppermost spindles also has fastened thereto a gear 98 constituting one end of a train of gears 99 fastened to the remaining spindles in each of the vertical rows, thereby to effect rotation of the respective vertical rows of spindles. The sprockets 87, 92, chain 94 and the gear trains for rotating the spindles are preferably enclosed within a casing 100.

Referring now to the stripper mechanism of my invention, each of the spindles has associated therewith a stripper device which in the form shown more in detail in Figs. 4 to 7, and indicated generally by the numeral 102, comprises a cylindrical portion or core 103 having a longitudinally extending internal bore 105 terminating in an enlarged end member 106. The bore of the strippers is of cruciform shape in cross-section conforming substantially to the cross-sectional shape of the grooving 62 of the spindles 60, so that the latter may be received for relatively easy reciprocating movement within the bore of their respective strippers, while at the same time causing the stripper to rotate therewith.

Fig. 5 shows the relative position of a spindle and a stripper in the extended position of the spindle, i. e., the position it occupies when at the limit of its forward movement to engage cotton in a cotton plant. Fig. 7 illustrates the relative position of the spindle and its stripper when the spindle is in fully retracted position.

It will be noted that the right angular corners 108 at the outer surface of the end members 106 of the strippers are in relatively close contact with the right angular intersecting corners of the radially extending ribs of the spindle throughout the reciprocating movement of the latter. Thus, as the rotating spindles carrying the cotton removed thereby from the bolls on a plant and wrapped around the spindles at the forward end thereof, are retracted in their reciprocating motion, the corners 108 of the strippers will force the cotton forwardly along the spindles until the outermost ends or tips of the spindles are retracted to a position inwardly of the end members 106 of the strippers, thus freeing the cotton from the spindles. As indicated in Fig. 7, the innermost or fully retracted position of each spindle is such as to bring its tip a substantial distance interiorly of the core of the stripper. This, together with the enlarged relatively flat surface area provided by the outer face of the end member 106, prevents any tendency on the part of the spindle to cause a threading out of any of the cotton lint from the mass of cotton discharged from the end of the spindle by the action of the stripper. Removal of cotton from adjacent the open end of the bore at the outer face of the member 106 is facilitated by the centrifugal action prevailing as a result of the rapid rotation of the strippers by their respective spindles.

The strippers in the form shown in Figs. 4 to 7 may be arranged so that each one of them will be in axial alignment with one of the spindles in the bank of spindles, by means of separators 110, and filler pieces 112, the strippers being provided with enlarged heads 114 at the opposite ends thereof to restrain the strippers against any substantial axial movement.

Another form of stripper is illustrated in Fig. 13. In the form there shown, the stripper comprises a cylindrical core 120 bored internally in the same fashion as the stripper 103 of Fig. 5, and pressed into a double shielded roller bearing 121 at the forward end thereof. The bearings 121 may be mounted in openings in a plate 123 suitably secured to the framework. In this form, the outer face of the bearing and of the plate 123 provide a substantially flat surface so that centrifugal action due to the rotation of the spindles and strippers will facilitate discharge of cotton from the tips of the spindles when the latter are retracted in their reciprocal motion to a position interiorly of the stripper core.

The cotton removed from the ends of the spindles by the action of the strippers upon retraction of the spindles through the strippers is evacuated and delivered to a suitable collecting receptacle (not shown) carried on the vehicle. It is one of the features of my invention that all the cotton thus removed from the spindles on each retractive stroke thereof is evacuated before the next forward stroke of the spindles, as otherwise the rapidly rotating spindles, upon coming into contact during such forward stroke with any cotton suspended in the space between the stripping mechanism and the cotton plant, will seize such cotton and cause it to become wrapped around the spindles and carried back into the plant, thus disabling the spindles from picking another mass of cotton upon entering the plant on this forward stroke.

A accordingly, means are provided in accordance with my invention whereby the cotton, picked by the spindles during each successive forward stroke into the cotton plant and removed from the spindles by the strippers upon each retractive stroke of the spindles, is evacuated, preferably by means of a stream of air, during the period of time elapsing between the moment the outer ends or tips of the spindles are just about retracted interiorly of the core of the strippers and their emergence therefrom on the next forward reciprocative stroke. The briefness of this period of time will be apparent when it is considered that in normal operation, with the spindles rotating at 1500 to 2500 R. P. M., the bank of spindles may be reciprocating at the rate of 100 strokes per minute.

To evacuate the stripped cotton in the manner described, movable shutters or gates are arranged in the path of movement of the spindles to operate in timed relation to the reciprocation of the bank of spindles, so that the shutters or gates may be moved into position in which they will be clear of the path of the spindles on their forward reciprocative stroke and to be moved, as the outer ends of the spindles are retracted into the strippers, into a position to form a substantially confined passageway between the shutters and the strippers. The cotton stripped from the spindles by the strippers may thus readily be removed by the aid of a blower or a suction fan during the time that the spindles are fully retracted into the strippers and before they next emerge therefrom.

One arrangement for achieving this purpose is illustrated in detail in Figs. 10 to 12 of the drawings. As there illustrated, a bar 126 secured as by a flange 127 at one end thereof to a bar carried by the reciprocating carriage 20, extends in a direction generally parallel to the path of movement of the reciprocating bank of spindles. The underside of the bar 126 is provided with a cam track 133 near the outer end thereof, within which is received a roller 134 having a downwardly extending stud 135. The lower end of the stud is connected to a bar 137 having links 138 pivotally connected thereto at suitably spaced intervals, the opposite end of each of these links being rigidly connected to a pintle 139 pivoted midway between each pair of horizontally adjacent rows of spindles and carrying a shutter or gate 140. These shutters are of a height approximately that of the spindle assembly and of a width substantially equal to the spacing between adjacent vertical rows of spindles.

Thus, as the carriage 20 reciprocates back and forth, carrying with it the spindle assembly and the bar 126, the roller 134 riding through the curved portion 141 of the cam track actuates the links 138 to swing the shutters from the position indicated in Fig. 10 to the position indicated in Fig. 12, to form a substantially confined passageway between the shutters and the strippers. The shape and location of the curved portion of the cam track is such that the shutters are in closed position of Fig. 12 when the forward ends of the spindles have been retracted into the strippers and until they emerge therefrom on the next forward movement of the carriage 20. Thereupon, the shutters are swung to their open positions in the forward movement of the carriage as the links 138 are actuated towards the position shown in Fig. 10, enabling the spindles to clear the shutters in their continued forward movement for next engagement with the cotton plant.

A plate 142 may be secured adjacent the lower ends of the shutters to extend also beneath the spindle and stripper assemblies, to serve as a bottom closure for the chamber or passageway formed when the shutters 140 are in the closed position indicated in Fig. 12, and if desired, a similar top closure 143 may be provided for the passageway.

A blower 150 may be mounted on the vehicle and connected by a conduit 151 to the forward end of the space between the shutters 140 and the strippers. The opposite end of this space may be connected by a duct 152 and conduit 153 to a suction fan 155 mounted on the vehicle and having its discharge end connected by a conduit 156 to a suitable collecting receptacle such as a basket or hopper (not shown) carried by the vehicle.

Under the action of the blower and the suction fan, all cotton stripped from the spindles when they have been retracted into the strippers and the shutters 140 have been closed, will be effectively evacuated from the space between the strippers and the shutters.

In the preferred form of the invention, there is provided means to cause cotton seized from the bolls by the rotating spindles when they have entered the plants, to become wound upon the spindles with adequate tightness and far enough back from the tip ends of the spindles to avoid any removal of cotton from the spindles, as by contact with other portions of the plants. Desirably this may comprise a plate 160 supported so as to extend in a vertical position at the side of the cotton plant opposite that from which the spindles enter the same (see Fig. 4). This plate has vertical and horizontal rows of perforations 161, the centers of each of the perforations being in horizontal alignment with the axis of rotation of one of the spindles. These perforations, instead of being circular as shown, may be of other suitable shapes, and in lieu of perforations, the plate 160 may be formed with outwardly extending suitably shaped depressions. The cotton seized from the bolls by each of the spindles will be carried thereby into contact with the periphery of the perforations or the depressions 161 in alignment therewith and while so held the spindles will extend through the cotton to some extent, causing the cotton to be pushed back on the spindles from the tip ends thereof and become firmly wrapped around the spindles by the rotation thereof.

A pair of spaced guides 170 having opposed rearwardly converging surfaces 171 may be provided for the purpose of gathering the limbs and branches of the plants into closer relation to one another and guiding them into position between the perforated plate 160 and the shutters 140. It will be seen that with the shutters in the open position indicated in Fig. 10, the hinge rods 139 of the shutters, which in actual practice would be spaced approximately two inches apart, serve as vertical grills or guards to keep the limbs or other parts of the plants from entering the space between the strippers and the shutters.

A pair of spaced horizontally extending guides 173, each preferably in the form of bent wires, may also be provided adjacent the guides 170.

In order to accommodate the machine for the picking of cotton from plants of varying height, provision may be made for vertically adjusting the position of the picking mechanism with respect to the ground level over which the vehicle is moved. For this purpose, there may be employed, in association with each of the axles of the front wheels of the vehicle, any convenient or usual form of hydraulic lift mechanism, such as indicated at 180, having its lower operative end fastened to the wheel axle. The hydraulically movable member 182 may be secured as by welding to the framework which supports the picking mechanism, and may be actuated for vertical movement by fluid under pressure admitted to the actuating cylinder through a feed line 184.

In the operation of the machine, as will now be understood, the vehicle on which it is mounted is moved so that the bank of spindles passes along a row of plants C (Fig. 3) at one side thereof. The spindles are rotated and the bank of spindles is reciprocated as a unit by the driving connections described so as to move the rotating spindles endwise into the plants. During this forward reciprocative movement, the shutters are moved toward and into the position shown in Fig. 10. When thus extended into the plants, the rotating spindles seize cotton with which they come into contact, the cotton becoming wrapped around the periphery of the spindles by the rotation thereof, assisted by the action resulting from the momentary impingement of the cotton held at the ends of the spindles within the perforations in the plate 160 and in contact with the peripheries thereof.

Upon the retractive movement of the bank of spindles endwise out of the plants, the cotton carried by the spindles is moved to the tip ends thereof by the flat outer surface 106 of the strippers. Since these flat surfaces have annular portions in the form of intersecting edges or corners 108 in relatively close nesting relation to the angularly intersecting faces of the grooved portion of the spindles, the cotton is prevented from entering the bore of the strippers or being held against removal by the suction exerted (by blower 150 and suction fan 155) through the substantially confined passageway formed adjacent the strippers when the shutters are in the position shown in Fig. 12. The cotton is thus evacuated from the confined chamber prior to the emergence of the spindles from the bores of the strippers in the next succeeding forward reciprocative stroke of the spindles, so that there will remain in the chamber no cotton which can be caught by the spindles during such stroke and prevent the spindles from picking cotton when again entering the plants. The enlarged flat outer surfaces 106 of the strippers ensure rapid removal of cotton as it is being stripped from the spindles, due to the centrifugal force exerted across those surfaces by the rapid rotation of the strippers by the spindles.

As hereinbefore indicated, the invention is readily adaptable to an embodiment in which cotton may be picked simultaneously from two adjoining rows of cotton. Such an embodiment is illustrated in Figs. 14 and 15 of the drawings in which certain of the parts corresponding to those shown in the embodiments of Figs. 1 to 13 are identified by the same reference characters.

In this embodiment, the reciprocating carriage 20 supports two banks of spindles 60 and 60a for movement therewith. Each of the spindles in one of the banks is in axial alignment with one of the spindles of the other bank and coupled thereto preferably by means of a reverse-threaded screw coupling 190, the shanks of the spindles being lengthened accordingly. In this way, rotation of the shaft 78 and consequent rotation of the spindles 60 of one bank through the intermeshing gears 89, 90 will also effect rotation of the spindles 60a of the other bank. The strippers for the spindles 60 are indicated at 103 and the strippers for the spindles 60a are indicated at 103a. A series of vertically hinged shutters 140a is provided for movement in timed relation to the reciprocation of the spindles 60a, these shutters being operated by means of links actuated from the cam track 133a in the bar 126a, in a manner similar to the shutters 140.

Thus, the vehicle carrying this two-row picking mechanism may be moved along in a path such that the plants of row C will pass through the space between the perforated plate 160 and the shutters 140 associated with the bank of spindles 60 while the plants of the adjoining row D move through the space between the perforated plate 160a and the shutters 140a associated with the bank of spindles 60a. Reciprocative movement of the carriage in one direction will cause the bank of spindles 60 to enter the plants of row C and remove cotton from the open bolls thereof, and upon the reverse movement of this bank of spindles towards the position for stripping the cotton therefrom by the strippers 103, the bank of spindles 60a will engage the cotton plants of row D to remove cotton from the open bolls thereof. Upon the return movement of the bank of spindles 60a to the position for stripping the cotton therefrom by the strippers 103a, the bank of spindles 60 will again enter the plants of row C.

What I claim is:

1. A cotton picking machine, comprising a reciprocatable bank of continuously rotatable spindles arranged in a plurality of rows, each of said spindles having longitudinally extending serrated ribs, a stationary bank of strippers, each of the strippers being carried by and rotatable with one of the spindles and having a longitudinally extending bore to slidably receive the ribbed spindle, to permit reciprocation of said spindles therethrough, a power unit, driving connections between said power unit and said bank of spindles to effect rapid continuous rotation of each of the spindles and reciprocation of the bank of spindles as a unit into and out of a row of plants from one side thereof, and shutters vertically mounted for movement adjacent each vertical row of spindles intermediate the forward end of the strippers and the outward limit of reciprocal movement of the spindles, and operable in timed relation to the reciprocation of the bank of spindles to form a confined passageway adjacent the forward end of the strippers when the spindles are in fully retracted position.

2. A cotton picking machine comprising a single bank of continuously rotatable spindles mounted to be reciprocated into and out of the cotton plants of a row from a position at one side of the row, each of said spindles having a serrated portion adjacent one end thereof, a stripper carried by each of said spindles and being rotatable therewith, and shutters in the path of movement of the serrated ends of the spindles, said shutters being hinged for swinging movement in timed relation to the reciprocating movement of the spindles so as to form a relatively confined passageway between the strippers and the shutters when the spindles are fully retracted within their respective strippers.

3. A cotton picking machine as set forth in claim 2 wherein said spindles are longitudinally chamfered to provide radially extending ribs, one of said ribs having serrations along the forward end thereof.

4. A cotton picking machine as set forth in claim 3, wherein each of said strippers comprises a cylindrical body having internal surfaces complementary to the ribs of the spindles.

5. A cotton picking machine as set forth in claim 4, wherein said strippers have an enlarged flat surface at the forward end thereof lying in a plane substantially normal to the path of reciprocation of the spindles.

6. A cotton picking machine comprising a single bank of continuously rotatable spindles provided with serrations along one end thereof and arranged in a plurality of rows for reciprocation as a unit into and out of a row of plants from one side of the row, a stationary bank of strippers, each of said strippers being carried by and rotatable with one of the spindles, and shutters mounted in the path of movement of the serrated ends of the spindles, said shutters being arranged for movement to open position out of the path of the spindles on each forward movement of the spindles and to closed position on each retracting movement of the spindles, to form in the last-named position a confined passageway between said strippers and said shutters.

7. A cotton picking machine comprising a single bank of continuously rotatable serrated spindles arranged in a plurality of rows for reciprocation as a unit into and out of a row of plants from one side of the row, a stationary bank of strippers, each of said strippers being arranged for reciprocation of one of said spindles therethrough and being rotatable therewith, a resistance member spaced from said bank of strippers so as to be positioned on the side of the plants of said row opposite that from which said spindles enter the same and at a distance to cause the cotton picked by the rotating spindles while in extended position within the plant to be firmly wrapped around the periphery of the spindles, and shutters mounted intermediate the strippers and said resistance member, said shutters being arranged for movement to open position out of the path of the spindles on each forward movement of the spindles and to closed position on each retracting movement of the spindles to form a confined passageway between said strippers and said shutters in their closed position.

8. A cotton picking machine, comprising in combination, a picking chamber, a plurality of columns of rotatable spindles, forming a bank of spindles, means including a gear fixed to the shaft of each spindle, for rotating the several spindles continuously, each spindle rotating always in the same direction, a fixed stripper column, individual strippers for each spindle, centrally apertured to slidably receive its respective spindle, each of said strippers being rotatably driven by its respective spindle and being rotatably mounted in said fixed stripper column, a guideway, including stationary parallel rails, fixed in the machine and extending transversely thereof, a reciprocatable carriage movable in a solely rectilinear path back and forth on said rails of said guideway, said bank of spindles and their driving gears being carried by said reciprocatable carriage, and eccentric means for reciprocating said carriage on said parallel rails for thereby projecting said spindles in a solely rectilinear path back and forth through the strippers in said fixed stripper column, into and out of said picking chamber.

9. A cotton picking machine, comprising in combination, a picking chamber, a plurality of columns of rotatable spindles, forming a bank of spindles, means including a driven gear fixed to the inner end of each spindle for rotating the several spindles continuously, each spindle rotating always in the same direction, a fixed stripper column, individual strippers for each spindle, centrally apertured to slidably receive its respective spindle, each of said strippers being rotatably driven by its respective spindle, said strippers being rotatably mounted in said fixed stripper column, a guideway, including parallel rails, fixed in the machine and extending transversely thereof, a reciprocatable carriage movable in a rectilinear path back and forth on said rails of said guideway, said bank of spindles and their driving gears being carried by said reciprocatable carriage, eccentric means for reciprocating said carriage on said parallel rails for thereby projecting said spindles back and forth through the strippers in said fixed stripper column, into and out of said picking chamber, and shutters mounted in the picking chamber, in the path of movement of the spindles, said shutters being arranged for movement to open position out of the path of the spindles on each forward movement of the spindles, and to closed position on each retracting movement of the spindles to form a confined passageway between said strippers and said shutters.

10. A cotton picking machine, comprising in combination, a picking chamber, a plurality of columns of rotatable spindles, forming a bank of spindles, means including a gear fixed to the shaft of each spindle, for rotating the several spindles continuously, each spindle rotating always in the same direction, a fixed stripper column, individual strippers for each spindle, centrally apertured to slidably receive its respective spindle, each of said strippers being rotatably driven by its respective spindle and being rotatably mounted in said fixed stripper column, a vertically positioned apertured plate positioned along one side of said picking chamber, the several apertures in said apertured plate being substantially circular and respectively alined with said spindles, a guideway, including stationary parallel rails, fixed in the machine on the other side of said picking chamber and extending transversely thereof, a reciprocatable carriage movable back and forth in a solely rectilinear path on said rails of said guideway, said bank of spindles and their driving gears being carried by said reciprocatable carriage, and eccentric means for reciprocating said carriage on said parallel rails for thereby projecting said spindles in a solely rectilinear path through the strippers in the fixed stripper column, to enter the apertures in said apertured plate on the side of said picking chamber.

11. A cotton picking machine, comprising in combination means defining two picking chambers, spaced apart in parallel relation, a double set of spindles positioned between said picking chambers, means for reciprocating said sets of spindles as a unit alternately into and out of their respective picking chambers, whereby as one set of spindles enters its picking chamber, the other set is withdrawn from its picking chamber, means for rotating all the spindles, each spindle being continuously driven in one direction, a fixed stripper column for each set of spindles, and strippers surrounding the respective spindles and journaled in respective stripper columns.

12. A cotton picking machine comprising in combination means defining two picking chambers, spaced apart in parallel relation, a double set of spindles positioned between said picking chambers, the spindles of one set being in alignment with, and secured to and movable with respective spindles in the other set, means for reciprocating said sets of spindles as a unit alternately into and out of their respective picking chambers, whereby as one set of spindles enters its picking chamber, the other set is withdrawn from its picking chamber, means for rotating all the spindles, each spindle being continuously driven in one direction, a fixed stripper column for each set of spindles, and strippers surrounding the respective spindles and journaled in respective stripper columns.

13. A cotton picking machine, comprising in combination means defining two picking chambers, spaced apart in parallel relation, a double set of spindles positioned between said picking chambers, means for reciprocating said sets of spindles as a unit alternately into and out of their respective picking chambers, whereby as one set of spindles enters its picking chamber, the other set is withdrawn from its picking chamber, means for rotating all the spindles, each spindle being continuously driven in one direction, a fixed stripper column for each set of spindles, strippers surrounding the respective spindles and journaled in respective stripper columns and a vertically positioned perforated plate positioned in each chamber on the side opposite where the spindles enter such chamber, the perforations in said plate being alined with respective spindles, and operating to receive the ends of the spindles at maximum stroke, whereby the edges of the perforations act to push cotton onto the body of the spindle.

ALBERT W. WEEMS.

REFERENCES CITED

The following references are of record in the file of this patent:

UNITED STATES PATENTS

| Number | Name | Date |
|---|---|---|
| 806,941 | Todd | Dec. 12, 1905 |
| 975,125 | Edwards | Nov. 8, 1910 |
| 1,088,703 | Ivey | Mar. 3, 1914 |
| 1,646,594 | Phelps et al. | Oct. 25, 1927 |
| 1,818,537 | Cullander | Aug. 11, 1931 |
| 1,909,646 | Wirth | May 16, 1933 |
| 2,004,713 | Thomann | June 11, 1935 |
| 2,261,572 | Smith | Nov. 4, 1941 |